(12) United States Patent
Ji

(10) Patent No.: US 12,111,763 B2
(45) Date of Patent: Oct. 8, 2024

(54) APPARATUS AND METHOD FOR DISTRIBUTING WORK TO A PLURALITY OF COMPUTE EXPRESS LINK DEVICES

(71) Applicant: SAMSUNG ELECTRONICS CO., LTD., Suwon-si (KR)

(72) Inventor: Soo-Young Ji, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/086,252

(22) Filed: Dec. 21, 2022

(65) Prior Publication Data

US 2023/0222062 A1    Jul. 13, 2023

(30) Foreign Application Priority Data

Jan. 7, 2022   (KR) .................. 10-2022-0003014
May 9, 2022   (KR) .................. 10-2022-0056857

(51) Int. Cl.
*G06F 3/06* (2006.01)
*G06F 12/0815* (2016.01)
*G06F 12/0871* (2016.01)

(52) U.S. Cl.
CPC ........ *G06F 12/0815* (2013.01); *G06F 3/0611* (2013.01); *G06F 3/0655* (2013.01); *G06F 3/067* (2013.01); *G06F 12/0871* (2013.01)

(58) Field of Classification Search
CPC ........ G06F 3/0655; G06F 3/067; G06F 3/061; G06F 3/0611
See application file for complete search history.

(56) References Cited

U.S. PATENT DOCUMENTS

| | | |
|---|---|---|
| 8,078,610 B2 | 12/2011 | Molini |
| 8,234,268 B2 | 7/2012 | Xu et al. |
| 10,168,915 B2 | 1/2019 | Aronvich et al. |
| 10,484,470 B2 | 11/2019 | Guo et al. |
| 10,719,264 B2 | 7/2020 | Kim |
| 10,976,935 B1 | 4/2021 | McCarthy et al. |
| 2021/0132999 A1* | 5/2021 | Haywood ............... G06F 9/544 |
| 2021/0303477 A1 | 9/2021 | Doshi et al. |
| 2022/0066928 A1* | 3/2022 | Tavallaei ............... G06F 12/123 |
| 2022/0114086 A1* | 4/2022 | Clark .................... G06F 9/5016 |

(Continued)

FOREIGN PATENT DOCUMENTS

WO    WO-2022125259 A1 *  6/2022  ........... G06F 9/4887

OTHER PUBLICATIONS

Das Sharma, D. and Agarwal, I., "Compute Express Link 3.0," 2022 available: https://computeexpresslink.org/resource-type/white-papers/.*

(Continued)

*Primary Examiner* — Tracy A Warren
(74) *Attorney, Agent, or Firm* — F. CHAU & ASSOCIATES, LLC

(57) ABSTRACT

An apparatus including: a plurality of compute express link (CXL) devices each including a memory and a processor for processing works stored in the memory; and a switch configured to connect the CXL devices to each other, wherein a first CXL device among the plurality of CXL devices selects at least one second CXL device from at least some CXL devices of the plurality of CXL devices to distribute works stored in a memory of the first CXL device based on a usable capacity of a memory of the at least some CXL devices.

15 Claims, 9 Drawing Sheets

(56) References Cited

U.S. PATENT DOCUMENTS

2022/0263913 A1* 8/2022 Zhang ............... G06F 3/0604
2023/0376412 A1* 11/2023 Erickson ............ G06F 12/0292

OTHER PUBLICATIONS

Das Sharma et al. (Das Sharma, D. and Tavallaei, Siamak., "Compute Express Link 2.0 White Paper," 2020 available: https://computeexpresslink.org/resource-type/white-papers/.*

* cited by examiner

APPARATUS AND METHOD FOR DISTRIBUTING WORK TO A PLURALITY OF COMPUTE EXPRESS LINK DEVICES

CROSS-REFERENCE TO RELATED APPLICATIONS

This application claims priority under 35 U.S.C. § 119 to Korean Patent Application No. 10-2022-0003014 filed in the Korean Intellectual Property Office on Jan. 7, 2022, and Korean Patent Application No. 10-2022-0056857 filed in the Korean Intellectual Property Office on May 9, 2022, the disclosures of which are incorporated by reference herein in their entireties.

(A) Technical Field

The present disclosure relates to an apparatus and method for cache-coherence.

(b) Description of the Related Art

Heterogeneous computing refers to systems that use more than one kind of processor or cores. For example, in heterogeneous computing, an accelerator developed for a special purpose may work together with a general-purpose processor.

Such an accelerator requires a high performance connection to the processor, and shares memory space to reduce overhead and latency. Accordingly, chip-to-chip interconnect protocols that connect processors to various accelerators to maintain memory and cache-coherence have been developed or are under development.

SUMMARY

An embodiment of the present disclosure provides an apparatus and method for cache-coherence that can efficiently manage memory resources.

An embodiment of the present disclosure provides an apparatus and method for cache-coherence that can reduce data skew.

An embodiment of the present disclosure provides an apparatus including: a plurality of CXL devices each including a memory and a processor for processing works stored in the memory; and a switch configured to connect the CXL devices to each other, wherein a first CXL device among the plurality of CXL devices selects at least one second CXL device from at least some CXL devices of the plurality of CXL devices to distribute works stored in a memory of the first CXL device based on a usable capacity of a memory of the at least some CXL devices.

An embodiment of the present disclosure provides an apparatus including: a plurality of first devices each including a memory and a processor for processing works stored in the memory; and a second device configured to determine at least one first device among the first devices to which works are to be distributed and a work amount to be distributed based on a work processing rate of each of the first devices and a usable capacity of a memory of each of the first devices, and to distribute works based on a work amount corresponding to each of the first devices to the at least one first device to which the works are to be distributed.

An embodiment of the present disclosure provides a method performed by a computing system including a plurality of CXL devices, the method including: checking usable capacities of the CXL, devices; selecting at least one first CXL device to which works are to be distributed among the CXL devices based on the usable capacities of the plurality of CXL devices; checking a work processing rate of the at least one first CXL device; and determining a distribution amount of works to be allocated to each of the at least one first CXL device based on the work processing rate of the at least one first CXL device.

DETAILED DESCRIPTION OF THE EMBODIMENTS

Figure 1:
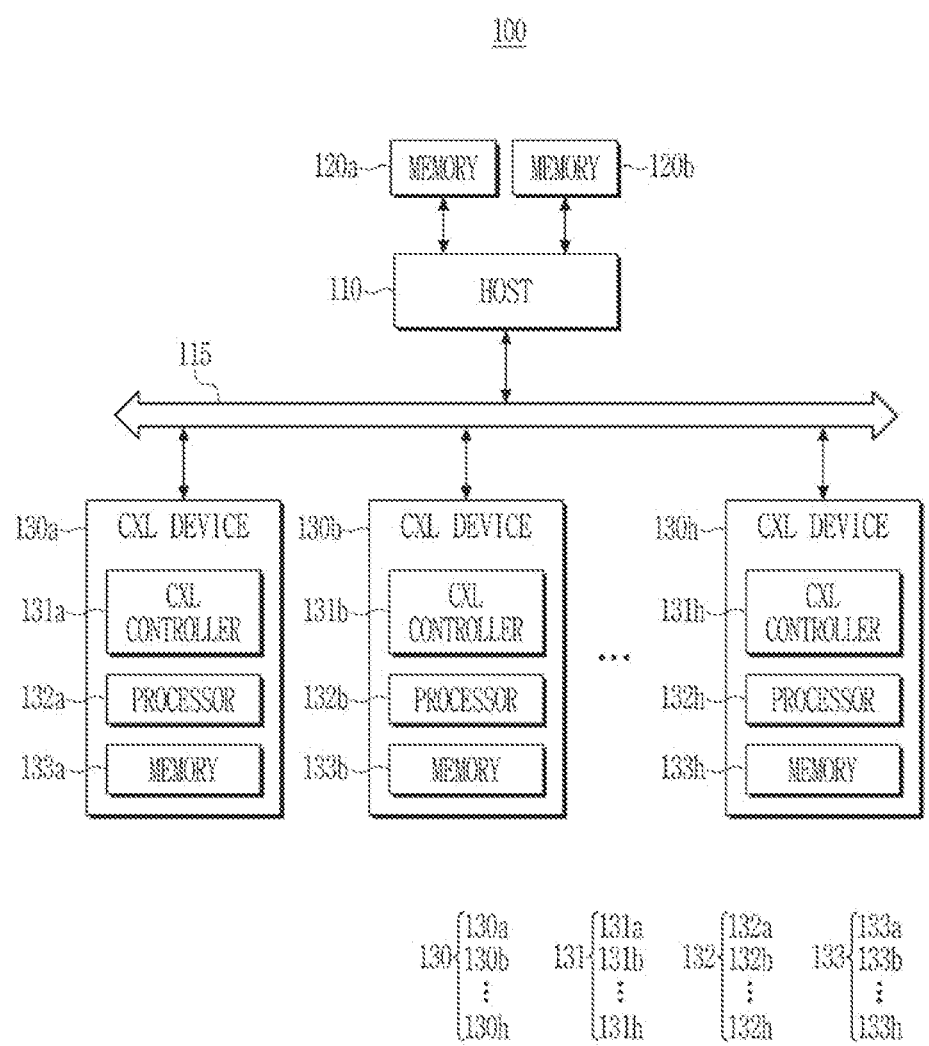
FIG. 1 illustrates a block diagram showing a computer system according to an embodiment of the present disclosure.

In the following detailed description, certain embodiments of the present disclosure will be shown and described. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals may designate Ike elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used to describe various components, and are not to be interpreted as limiting these components. These terms may be used for the purpose of distinguishing one element from other elements.

FIG. 1 illustrates a block diagram showing a computer system according to an embodiment of the present disclosure.

Referring to FIG. 1, the computer system 100 may include a host 110, a plurality of memories 120*a* and 120*b*, and at least one compute express link (CXL) device 130*a*, 130*b* . . . , 130*h*. In an embodiment, the computer system 100 may be included in user devices such as a personal computer, a laptop computer, a server, a media player, and a digital camera, or in an automotive device such as a navigation system, a black box, or a vehicle electric device. Alternatively, the computer system 100 may be a mobile system such as a portable communication terminal (e.g., a mobile phone), a smart phone, a tablet personal computer (PC), a wearable device, a healthcare device, or an Internet of things (IOT) device.

The host 110 may control overall operations of the computer system 100. In an embodiment, the host 110 may be one of various processors such as a central processing unit (CPU), a graphics processing unit (GPU), a neural processing unit (NPU), a tensor processing unit (TPU), and the like. In an embodiment, the host 110 may include a single-core processor or a multi-core processor.

In an embodiment, the host 110 may split works, distribute the works to the CXL devices 130, and collect results thereof. The host 110 may distribute work including data and a program (e.g., a workload) used to process the data to the CXL devices 130. In some embodiments, the host 110 may check usable memories of the CXL devices 130*a*, . . . , and 130*h*. The host 110 may determine whether to distribute work to each of the CXL devices 130*a*, . . . , and 130*h* depending on the usable memories of the CXL devices 130*a*, . . . , and 130*h*. The host 110 may determine whether to distribute the work to each of the CXL devices 130*a*, . . . , and 130*h* by further considering an amount of data to be processed that is currently stored in each of the memory devices 120*a* and 120*b*. The host 110 may check work processing rates of the CXL devices 130*a*, . . . , and 130*h*. The host 110 may use the work processing rates of the CXL devices 130*a*, . . . , and 130*h* to distribute the work to the CXL devices 130*a*, . . . , and 130*h*, may calculate the time until it receives a result thereof, compares this with a time it takes for the host 110 to process the work to be processed that is currently stored in each of the memory devices 120*a* and 120*b*, and may determine whether to distribute the work to each of the CXL devices 130*a*, . . . , and 130*h*. The host 110 may determine an amount of data of work to be distributed to each of the CXL devices 130*a*, . . . , and 130*h* depending on the work processing rates of the CXL devices 130*a*, . . . , and 130*h*.

The memory devices 120*a* and 120*b* may be used as a main memory or a system memory of the computer system 100. In an embodiment, each of the memory devices 120*a* and 120*b* may be a dynamic random access memory (DRAM) device and may have a form factor of a dual in-line memory module (SIMM). However, the scope of the present disclosure is not limited thereto, and the memory devices 120*a* and 120*b* may include nonvolatile memories such as a flash memory, a phase-change random access memory (PRAM), a resistive random access memory (RRAM), and a magnetoresistive random access memory (MRAM).

The memory devices 120*a* and 120*b* may directly communicate with the host 110 through a double data rate (DDR) interface. In an embodiment, the host 110 may include a memory controller configured to control the plurality of memory devices 120*a* and 120*b*. However, the scope of the present disclosure is not limited thereto, and the memory devices 120*a* and 120*b* may include nonvolatile memories such as a flash memory, a PRAM, an RRAM, and an MRAM.

The CXL devices 130 may include a CXL controller 131, a processor 2, and a memory 133.

The CXL controller 131 may include an intellectual property (IP) circuit designed to implement an application specific integrated circuit (ASIC) and/or a field-programmable gate array (FPGA). In various embodiments, the CXL controller 131 may support a CXL protocol (e.g., a CXL 2.0 protocol or any other version). The CXL controller 131 may convert CXL packets and signals of a memory interface of the memory 133.

The CXL controller 131 may divide works, may distribute the works to the CXL devices 130, and may collect results of works distributed to the CXL device 130. The CXL controller 131 may distribute work including data and a program (e.g., a workload) used to process the data to the CXL devices 130. In some embodiments, a CXL controller (e.g., 131*a*) of one CXL device (e.g., 130*a*) of the CXL devices 130*a*, 130*b*, . . . , and 130*h* may check usable memories of the other CXL devices 130*b*, . . . , and 130*h*. The CXL controller (e.g., 131*a*) of one CXL device (e.g., 130*a*) of the CXL devices 130*a*, 130*b*, . . . , and 130*h* may determine whether to distribute the work to each of the other CXL devices 130*b*, . . . , and 130*h* depending on the usable memories of the CXL devices 130*b*, . . . , and 130*h*. The CXL controller (e.g., 131*a*) of one CXL device (e.g., 130*a*) of the CXL devices 130*a*, 130*b*, . . . , and 130*h* may determine whether to distribute the work to each of the CXL devices 130*b*, . . . , and 130*h* by further considering an amount of the work to be processed that is currently stored in the memory (e.g., 133*a* of 130*a*). In some embodiments, a CXL controller (e.g., 131*a*) of one CXL device (e.g., 130*a*) of the CXL devices 130*a*, 130*b*, . . . , and 130*h* may check work processing rates of the other CXL devices 130*b*, . . . , and 130*h*. The CXL controller (e.g., 131*a*) of one CXL device (e.g., 130*a*) of the CXL devices 130*a*, 130*b*, . . . , and 130*h* may calculate an expected time between distributing the works to the other CXL devices 130*b*, and 130*h* and receiving results of works distributed to the other CXL devices 130*b*, . . . , and 130*h*, by using the work processing rates of the other CXL devices 130*b*, . . . , and 130*h* and may determine whether to distribute the works to each of the other CXL devices 130*b*, . . . , and 130*h* by comparing the expected time with a time it takes for the processor (e.g., 132*a* of 130*a*) to process the works to be processed that are currently stored in the memory 133*a*. The CXL controller (e.g., 131*a*) of one CXL device (e.g., 130*a*) of the CXL devices 130*a*, 130*b*, . . . , and 130*h* may determine an amount of data of work to be distributed to each of the other CXL devices 130*b*, . . . , and 130*h* depending on the work processing rates of the other CXL devices 130*b*, . . . , and 130*h*.

The processor 132 may be configured to control overall operations of the CXL devices 130. The processor 132 may perform various operations performed by the CXL devices 130, and may process data. For example, the processor 132 may perform an operation on data stored in the memory 133, The processor 132 may perform filtering on data stored in the memory 133. The processor 132 may process data of the distributed work using a program of the distributed work.

In an embodiment, each of the CXL devices 130*a*, 130*b*, . . . , and 130*h* may be implemented as an individual memory device or memory module. Each of the CXL devices 130*a*, 130*b*, . . . , and 130*h* may be connected to a cache-coherency interface 115 through different physical ports. In other words, a memory area managed by the host 110 may increase in capacity by connecting the CXL devices 130*a*, 130*b*, . . . , 130*h* to the cache-coherency interface 115. At least some of a plurality of memories 133*a*, 133*b*, . . . , and 133*h* of the CXL devices 130*a*, 130*b*, . . . , and 130*h* may be managed as one memory cluster. In some embodiments, at least some of the memories 133a, 133b, . . . , and 133h may be managed as at least one of a direct-attached memory cluster, a pooled memory cluster, a distributed memory cluster, or a disaggregated memory cluster.

The memory 133 may include one of a dynamic random access memory (DRAM), a not-and (NAND) flash, a high bandwidth memory (HBM), a hybrid memory cube (HMC), a dual in-line memory module (DIMM), an optane DIMM, an non-volatile DIMM (NVMDIMM), a double data rate synchronous DRAM (DDR SDRAM), a low-power double data rate synchronous dynamic random access memory, or a combination thereof.

In an embodiment, the host 110 and the CXL devices 130 may be configured to share a same interface with each other. For example, the host 110 and the CXL device 130 may communicate with each other through the cache-coherency interface 115. The host 110 may access the memory 133 of a CXL device 130 through the cache-coherency interface 115, and the CXL devices 130 may also access the memories 120a and 120b of the host 110 and/or the memory 133 of another CXL device 130 through the cache-coherency interface 115. For example, the CXL device 130b may access the memory 133a of the CXL device 130a through the cache-coherency interface 115.

In an embodiment, the cache-coherency interface 115 may refer to low-latency and high-bandwidth links that enable various connections between accelerators, memory devices, or various electronic devices by supporting coherency, memory access, and dynamic protocol multiplexing of an input and output (IO) protocol. Hereinafter, for better understanding and ease of description, it is assumed that the host 110 and the CXL devices 130 communicate with each other through the CXL interface 115. However, the cache-coherency interface 115 is not limited thereto, and the host 110 and the CXL devices 130 may communicate with each other based on various computing interfaces such as a GEN-Z protocol, an NVLink protocol, a cache coherent interconnect for accelerators (CCIX) protocol, an open coherent processor accelerator interface (CAPI) protocol, and the Ike.

CXL, which is an open industry standard for communications based on peripheral component interconnect express (PCIe) 5.0, can provide a fixed and relatively short packet size, resulting in a relatively high bandwidth and a relatively low fixed latency. As such, the CXL may support cache-coherency, and CXL is well suited for creating connections to memories. CXL may be used in a server to provide connections between the host 110 and the CXL devices 130 (e.g., accelerators, memory devices, and network interface circuits (or "network interface controllers" or network interface cards (NICs))).

A cache-coherency protocol such as CXL may be used for heterogeneous computing, e.g., in scalar, vector, and buffered memory systems. The CXL may be used to provide a cache-consistent interface by leveraging channels, retimers, PHY layers of systems, logical aspects of interfaces, and protocols from PCIe 5.0. A CXL transaction layer may include three multiplexed sub-protocols operating simultaneously on a single link, which may be referred to as CXL.io, CXL.cache, and CXL.mem, respectively. The CXL.io may contain I/O semantics that may be similar to PCIe. The CXL.cache may include caching semantics, the CXL.mem may include memory semantics, and both the caching semantics and the memory semantics may be optional. Similar to PCIe, CXL may support (i) a base width of x16, x8, and x4 that are divisible, (ii) 8 GT/s and 16 GT/s, with a data rate of 32 GT/s capable of degrading to 128b/130b, (iii) 300 W (75 W in×16 connector), and (iv) plug and play. To support the plug and play, a PCIe or CXL device link may also start training on a PCIe of Gen1, may negotiate a CXL, and may start a CXL transaction after completing Gen 1-5 training.

Figure 2:
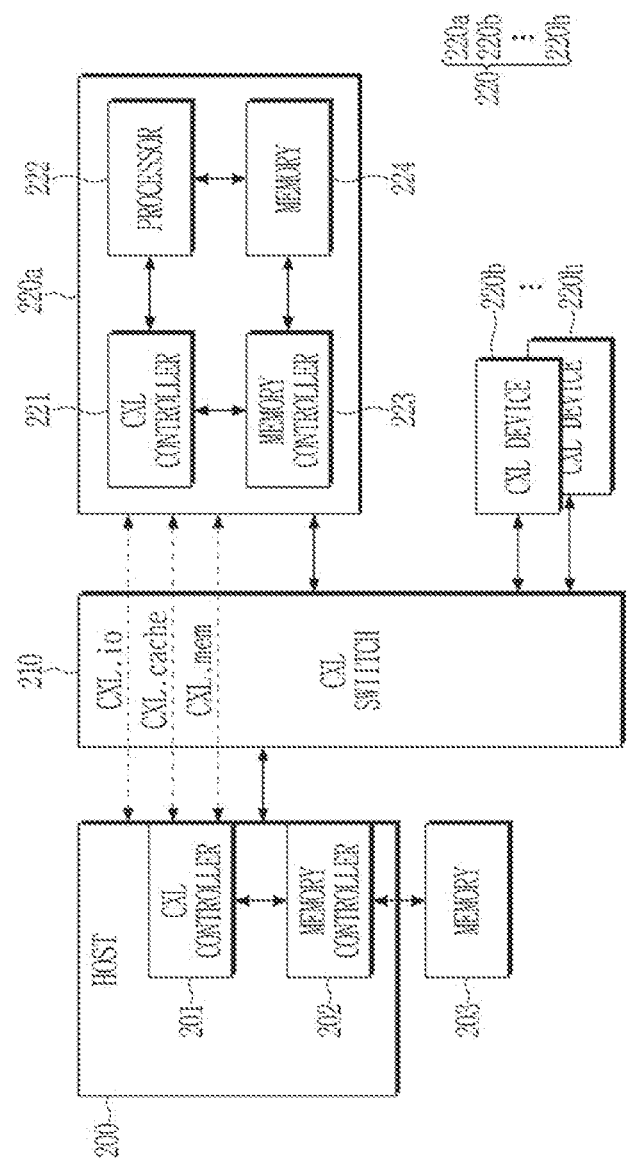
FIG. 2 illustrates a detailed block diagram showing some elements of a computer system according to an embodiment of the present disclosure.

FIG. 2 illustrates a detailed block diagram showing some elements of a computer system according to an embodiment of the present disclosure.

Referring to FIG. 2, a host 200 and CXL devices 220a, 220b, . . . , and 220h may communicate with each other through a CXL switch 210. The CXL switch 210 may be a component included in a CXL interface. In other words, the CXL switch 210 may be part of the CXL interface 115 shown in FIG. 1. The CXL switch 210 may be configured to mediate communication between the host 200 and the CXL devices 220. For example, when the host 200 and the CXL devices 220 communicate with each other, the CXL switch 210 may be configured to transmit information such as a request, data, a response, or a signal transmitted from the host 200 or the CXL devices 220 to the CXL devices 220 or the host 200. When the CXL devices 220a, 220b, . . . , and 220h communicate with each other, the CXL switch 210 may be configured to pass information such as a request, data, a response, or a signal between the CXL devices 220a, 220b, . . . , and 220h.

The host 200 may include a CXL controller 201. The CXL controller 201 may communicate with the CXL devices 220 through the CXL switch 210. The CXL controller 201 may be connected to a memory controller 202 of the host 200 and an associated memory 203.

The CXL switch 210 may be used to implement a memory duster through one-to-many and many-to-one switching between the connected CXL devices 220a, 220b, . . . , and 220h. For example, the CXL switch 210 (i) may connect multiple root ports to one endpoint, (ii) may connect one root port to multiple endpoints, or (iii) may connect multiple root ports to multiple endpoints.

In addition to providing packet-switching functionality for CXL packets, the CXL switch 210 may be used to connect the CXL devices 220a, 220b, . . . , and 220h to one or more hosts 200. The CXL switch 210 (i) may allow the CXL devices 220a, 220b, . . . , and 220h to contain different types of memory with different characteristics, (ii) may virtualize memories of the CXL devices 220a, 220b, . . . , and 220h and allow data of different characteristics (e.g., access frequency) to be stored in an appropriate type of memory, and (iii) may support remote direct memory access (RDMA), Herein, "virtualizing" the memory indicates performing memory address translation between a processing circuit and a memory.

The CXL device 220a may include a CXL controller 221, a processor 222, a memory controller 223, and a memory 224. Other CXL devices 220b, . . . , and 220h may also include same or similar components to those of the CXL device 220a. In other words, the CXL device 220b may include a CXL controller, a processor, a memory controller and a memory.

The CXL controller 221 may be connected to the CXL switch 210. The CXL controller 221 may communicate with the host 200 and/or other CXL devices 220b, . . . , and 220h through the CXL switch 210. The CXL controller 221 may include a PCIe 5.0 (or other version) architecture for a CXL.io path, and may add CXL.cache and CXL.mem paths specific to CXL. In another embodiment, the CXL controller 221 may be configured to be backward compatible with older cache-coherency protocols such as CXL 1.1. The CXL controller 221 may be configured to implement CXL.io, CXL.mem, and CXL.cache protocols or other suitable cache-consistent protocols. The CXL controller 221 may be configured to support different CXL device types, such as Type 1, Type 2, and/or Type 3 CXL devices. The CXL controller 221 may be configured to support a PCIe protocol, such as a PCIe 5.0 protocol. The CXL controller 221 may be configured to support a PIPE 5.x protocol by using any suitable PIPE interface width (e.g., 8-, 16-, 32-, 64-, and 128-bit configurable PIPE interface widths). The CXL controller 221 may be configured to support various CXL device configurations such as those illustrated and described with respect to FIG. 2.

The processor 222 may be configured to control overall operations of the CXL device 220a. The processor 222 may perform an operation on data stored in the memory 224. The processor 222 may perform filtering on data stored in the memory 224.

The memory controller 223 may control the memory 224 such that data is stored in the memory 224 or data is read from the memory 224. In an embodiment, the memory controller 223 may be implemented to conform to standard protocols, such as a double data rate (DDR) interface, a graphics DDR (GDDR) interface, and a low power DDR (LPDDR) interface. The memory 224 may store data or output stored data under control of the memory controller 223.

The memory controller 223 may be configured to manage the memory 224. In some embodiments, the memory controller 223 may check the usable capacity of the memory 224.

In an embodiment, at least a portion of an area of the memory 224 of the CXL device 220a may be allocated as a dedicated area for the CXL device 220a, and a remaining area of the CXL device 220a may be used as an area that is accessible by the host 200 or the other CXL devices 220b, . . . , and 220h.

In an embodiment, at least a portion of an area of the memory 224 of the CXL device 220a stores data and programs of works distributed by the CXL device 220a, and a remaining area of the memory 224 of the CXL device 220a may store data and programs of works distributed by the host 200 or the other CXL devices 220b, . . . , and 220h. This will be described with reference to FIG. 3.

Figure 3:
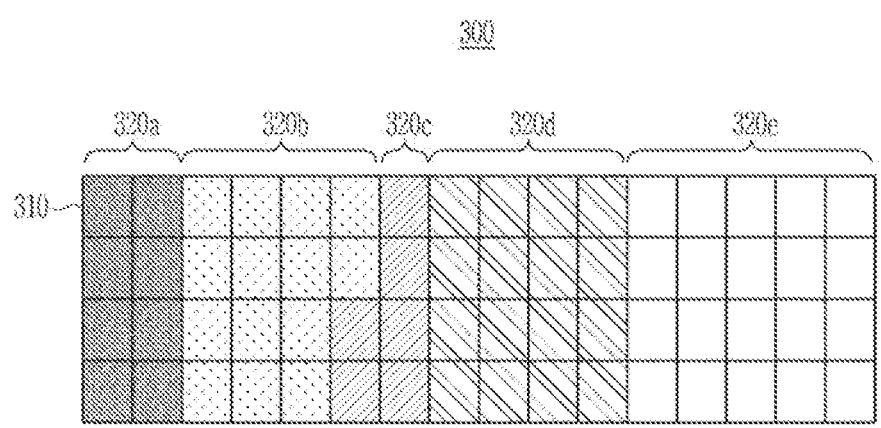
FIG. 3 illustrates a memory of a compute express link (CXL) device according to an embodiment of the present disclosure.

FIG. 3 illustrates a memory of a CXL device according to an embodiment of the present disclosure.

Referring to FIG. 3, a memory 300 may include a plurality of memory blocks 310. In an embodiment, the memory 300, which is a physical memory, may be divided into a plurality of physical memory blocks 310. In other words, the memory blocks 310 may be physical memory blocks. In another embodiment, the memory blocks 310 may be blocks into which the memory 300 that is virtualized is divided. Each of the memory blocks 310 may be allocated as a dedicated memory space for each of the devices (e.g., the host 200 and the CXL devices 220a, . . . , and 220h).

Distributed works may be stored in the memory 300. In some embodiments, a corresponding work may be assigned to each of the memory blocks 310. A first work may be assigned to blocks 320a of the memory 300, a second work may be assigned to blocks 320b of the memory 300, a third work may be assigned to blocks 320c of the memory 300, and a fourth work may be assigned to blocks 320d of the memory 300. The first to fourth works may be assigned by one or more of the devices (e.g., the host 200 and the CXL devices 220a, . . . , and 220h).

Although it has been described above that works are allocated in units of blocks, a storage space of the memory 300 may be divided into units other than blocks, and the works may be stored in the divided storage spaces. A block is a unit for indicating the capacity of the memory 300, and a description of the capacity of the memory 300 is not limited thereto.

The memory 300 may include a usable space in which works are not stored. No work may be allocated to some blocks 320e of the memory 300. Some blocks 320e of the memory 300 may not be allocated as a dedicated space of a certain device. The usable capacity of the memory 300 may correspond to the capacity of the blocks 320e.

Referring back to FIG. 2, the memory controller 223 may check the usable capacity of the memory 224. The memory controller 223 may allocate works to be distributed from other devices to the usable space of the memory 224. For example, a work from the CXL device 220b may be stored in the usable space of the memory 224.

In an embodiment, the host 200 and the CXL devices 220 may communicate with each other using an input and output protocol, CXL.io. The CXL.io may have a PCIe-based non-consistent input and output protocol. The host 200 and the CXL devices 220 may exchange user data or various information with each other by using the CXL.io.

In an embodiment, the host 200 and the CXL devices 220 may communicate with each other using a memory access protocol, e.g., CXL.cache. The CXL devices 220 may use the CXL.cache to access a portion of the memory 203 of the host 200.

In an embodiment, the host 200 and the CXL devices 220 may communicate with each other using a memory access protocol, e.g., CXL.mem. The host 200 may use the CXL.mem to access some areas of the memory 224 of the CXL devices (e.g., 220a).

The above-described access types (CXL.io, CXL.cache, CXL.mem, etc.) are merely examples, and the scope of the present disclosure is not limited thereto.

In an embodiment, the CXL devices 220 may be mounted on a physical port based on a CXL interface (e.g., a PCIe physical port). In an embodiment, the CXL devices 220 may be implemented based on E1.S, E1.L, E3.S, E3.L, PCIe AIC (CEM) form factors. Alternatively, the CXL devices 220 may be implemented based on a U.2 form factor, an M.2 form factor, or other various types of PCIe-based form factors, or other various types of small form factors. The CXL devices 220 may be implemented in various form factors, and may support a hot-plug function that may be mounted to or removed from a physical port.

Figure 4:
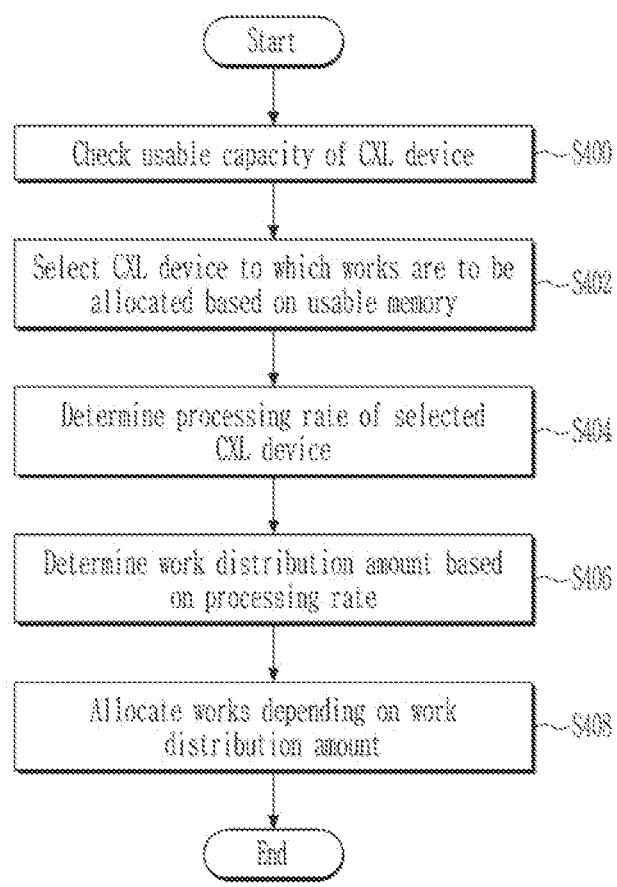
FIG. 4 illustrates a flowchart showing a work distribution method according to an embodiment of the present disclosure.

FIG. 4 illustrates a flowchart showing a work distribution method according to an embodiment of the present disclosure.

Next, a work distribution method will be described with reference to FIG. 2 to FIG. 4. Hereinafter, the CXL device 220a will be described as a subject of operation.

The CXL controller 221 of the CXL device 220a checks the usable capacity of the memories of the other CXL devices 220b, . . . , and 220h (S400). For example, the CXL controller 221 may request a usable capacity from each of the CXL devices 220b, . . . , and 220h through the CXL switch 210. In response to the request, the memory controller of each of the CXL devices 220b, . . . , and 220h may check the usable capacity of the corresponding memory. The CXL controller of each of the CXL devices 220b, . . . , and 220h may transmit the usable capacity of the memory checked through the CXL switch 210 to the CXL controller 221. In addition, various methods of checking the usable capacity of each of the CXL devices 220a, 220b, ..., and 220h among the CXL devices 220a, 220b, ..., 220h connected through the CXL switch 210 may be used, but the present disclosure is not limited to the above description.

The CXL controller 221 of the CXL device 220a may perform step S400 when data of work to be processed is excessively stored in the memory 224. For example, the CXL device 220a may receive a work request from the host 200. The CXL controller 221 of the CXL device 220a may check the usable capacity of the memories of the other CXL devices 220b, ..., and 220h when it is determined that the work requested from the host 200 cannot be performed within a predetermined period. Alternatively, the CXL controller 221 of the CXL device 220a may check the usable capacity of the memories of the other CXL devices 220b, ..., and 220h when it is determined that excessive time is taken to process the work requested from the host 200. Alternatively, the CXL controller 221 of the CXL device 220a may check the usable capacity of the memories of the other CXL devices 220b, ..., and 220h when data included in the work requested from the host 200, e.g., all of the data to be processed, cannot be stored in the memory 224. In addition, the CXL controller 221 of the CXL device 220a may initiate step S400 in various situations, but the present disclosure is not limited to the above description.

The CXL controller 221 of the CXL device 220a determines the CXL device to which the work is assigned based on the checked usable capacity (S402). In some embodiments, the CXL controller 221 may determine whether to allocate work to each of the other CXL devices 220b, ..., and 220h based on the usable capacity of each of the other CXL devices 220b, ..., and 220h. For example, the CXL controller 221 may determine to allocate work to at least one CXL device among the CXL devices 220b, ..., and 220h when the usable capacity of the at least one CXL device is greater than or equal to the usable capacity of the memory 224. The CXL controller 221 may determine to allocate work to the at least one CXL device when the usable capacity of at least one of the other CXL devices 220b, ..., and 220h is equal to or greater than a reference usable capacity.

The CXL controller 221 determines a processing rate of the at least one CXL device selected to allocate work (S404). In some embodiments, the CXL controller 221 may determine a processing rate of the at least one CXL device selected to work by transmitting work to the at least one CXL device selected to allocate the work and receiving a processing result from the at least one CXL device. It is to be understood that this process may be performed for each CXL device selected to work. For example, the CXL controller 221 may transmit a program and some data of the work to be allocated to the at least one CXL device selected to allocate the work through the CXL switch 210, The CXL controller 221 may receive a result of the work from the at least one CXL device selected to allocate the work through the CXL switch 210. The CXL switch 210 may determine a processing rate of the at least one CXL device selected to allocate the work by using a processing time from when the program and some data of the work to be allocated to the at least one CXL device are transmitted to the at least one CXL device until receiving the result of the work from the at least one CXL device. The CXL switch 210 may transmit the determined processing rate of the at least one CXL device to the CXL controller 221. In some embodiments, the CXL switch 210 may also transmit information related to the processing time to the CXL controller 221. The CXL controller 221 may further determine a data transfer rate through the CXL switch 210 based on a time to transmit the program and some data of the work to the CXL switch 210 and to receive a result of the work from the CXL switch 210 and a processing time transferred from the CXL switch 210.

In an embodiment, the CXL controller 221 may calibrate a processing rate of the at least one CXL device selected to allocate the work based on usable capacity of the at least one CXL device. In some embodiments, the CXL controller 221 may calibrate the processing rate of the at least one CXL device selected to allocate the work to be lower when the usable capacity of at least one CXL device is smaller than or equal to a predetermined percentage of the memory capacity of the at least one CXL device. For example, when the usable capacity of at least one CXL device selected to allocate the work is half of the memory capacity of the at least one CXL device, the CXL controller 221 may reduce the processing rate of the at least one CXL device by half to correct or compensate for this deficiency. In addition, when the usable capacity of the at least one CXL device selected to allocate the work is one quarter of the memory capacity of the at least one CXL device, the CXL controller 221 may reduce the processing rate of the at least one CXL device by one quarter to correct or compensate for this deficiency.

The CXL controller 221 determines a work distribution amount based on the processing rate of the at least one CXL device selected to allocate the work (S406). The CXL controller 221 may determine the distribution amount in consideration of a time taken for allocating some of the works to be processed stored in the memory 224 to the at least one CXL device selected to allocate the work and processing it and a time it takes for the processor 222 to process the other of the works stored in the memory 224 that are not allocated to the at least one CXL device. For example, the CXL controller 221 may determine the distribution amount to be allocated to the at least one CXL device selected to allocate the work such that the time taken for allocating some of the works to be processed stored in the memory 224 to the at least one CXL device and processing it and the time it takes for the processor 222 to process the other of the works stored in the memory 224 that are not allocated to the at least one CXL device are substantially the same. The CXL controller 221 may determine that the work distribution amount to be allocated to the at least one CXL device increases in an order of the corrected processing rate. Since the CXL controller 221 uses the corrected processing rate, a small work distribution amount may be determined for a CXL device having a small usable capacity. Accordingly, the CXL device 220 according to an embodiment may prevent a problem in which the allocated work cannot be processed, which may occur due to insufficient usable capacity of the CXL device to which the work is to be allocated, although the work is allocated only at the processing rate.

In some embodiments, the CXL controller 221 may calculate a time required for allocating some of the works to be processed stored in the memory 224 to the at least one CXL device selected to allocate the some works and processing it by using a processing rate of at least one CXL device. In some embodiments, the CXL controller 221 may calculate the time required for allocating some of the works to be processed stored in the memory 224 to the at least one CXL device selected to allocate the some works and processing it by further using the data transfer rate that is additionally calculated in step S404. The CXL controller 221 may calculate the time required for allocating some of the works to be processed stored in the memory 224 to the at least one CXL device selected to allocate the some works and processing it by using the processing rate and the data transfer rate of at least one CXL device.

The CXL controller 221 distributes work depending on the determined work distribution amount at least one CXL device selected to allocate the works (S408). The CXL controller 221 may transmit a work depending on the determined work distribution amount among the works stored in the memory 224 to the at least one CXL device selected to allocate the works through the CXL switch 210.

When step S408 is performed and data of the work to be processed is excessively stored in the memory 224, the CXL controller 221 of the CXL device 220a may perform step S400 again. Similarly, even when the data of the work to be processed is excessively stored in the memory 224 of each of the other CXL devices 220b, ..., and 220h, step S400 may be performed again by each of the other CXL devices 220b, ..., and 220h.

Depending on the work distribution method according to the embodiment as described above, the work processed by the CXL device 220a is processed by the other CXL devices 220b, ..., and 220h, such that throughput per hour may be increased.

Figure 5:
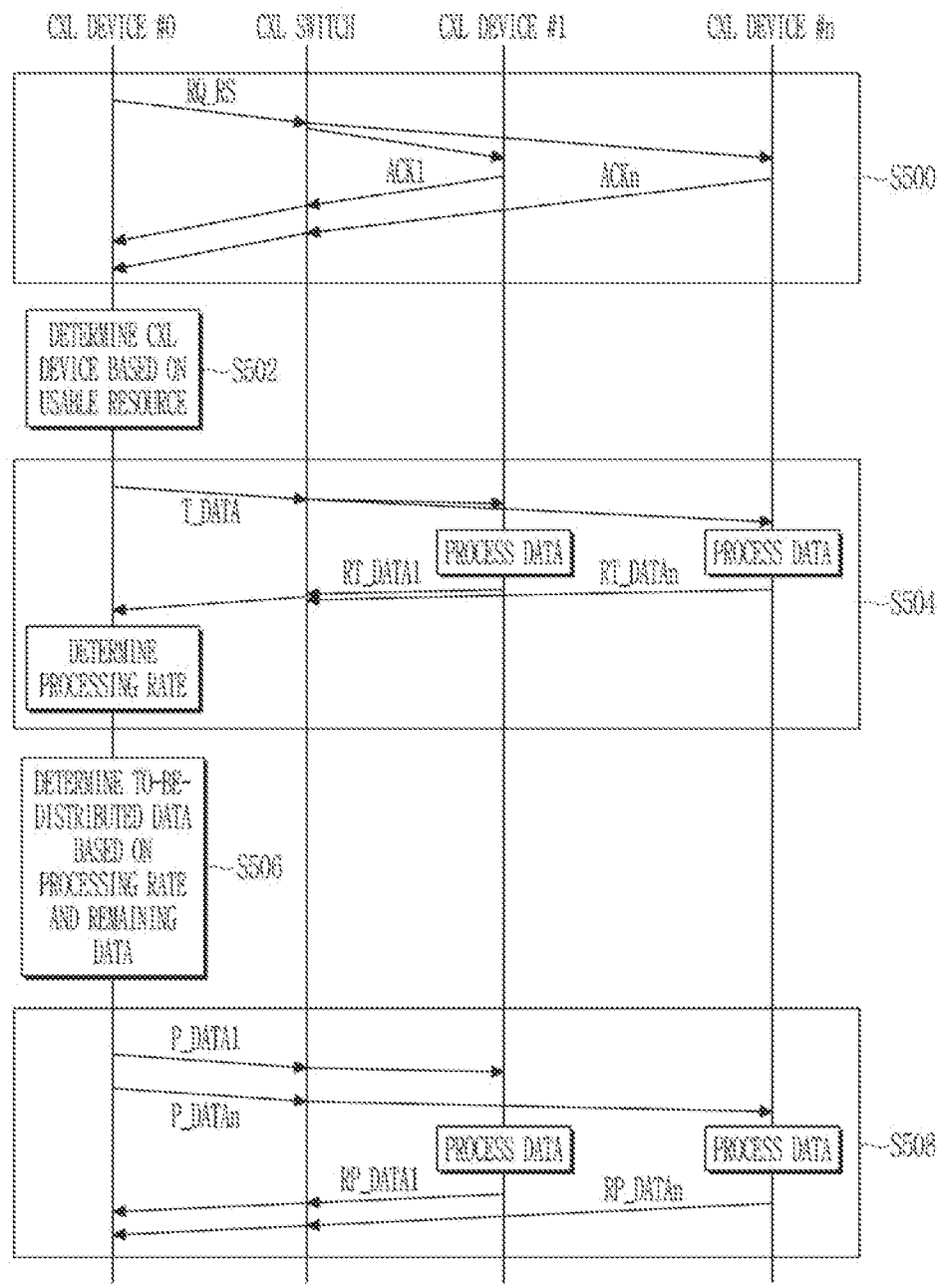
FIG. 5 illustrates a flowchart showing a work distribution method between CXL devices according to an embodiment of the present disclosure.

FIG. 5 illustrates a flowchart showing a work distribution method between CXL devices according to an embodiment of the present disclosure.

FIG. 5 illustrates a case in which the CXL device CXL DEVICE #0 distributes works to other CXL devices CXL DEVICE #1, ..., and #n. Referring to FIG. 5, in step S500, the CXL device CXL DEVICE #0 may check usable capacities of the other CXL devices CXL DEVICE #1, ..., and #n. The CXL device CXL DEVICE #0 transmits a command RQ_RS for checking usable capacity to the CXL switch CXL SWITCH, and the CXL switch CXL SWITCH transmits the command RQ_RS to the other CXL devices CXL. DEVICE #1, ..., and #n. When the CXL devices CXL. DEVICE #1, ..., and #n receive the command RQ_RS, they can check a total amount of memory used by processes allocated to their memory to check usable capacity.

The CXL devices CXL DEVICE #1, ..., and #n transmit the usable capacity of their memory to the CXL switch CXL. SWITCH as responses ACK1, ..., and ACKn to the command RQ_RS, and the CXL switch CXL SWITCH may transmit the responses ACK1, and ACKn of the other CXL devices CXL DEVICE #1, ..., and #n to the CXL device CXL DEVICE #0. In relation to step S500, it will be described with reference to FIG. 6 together.

Figure 6:
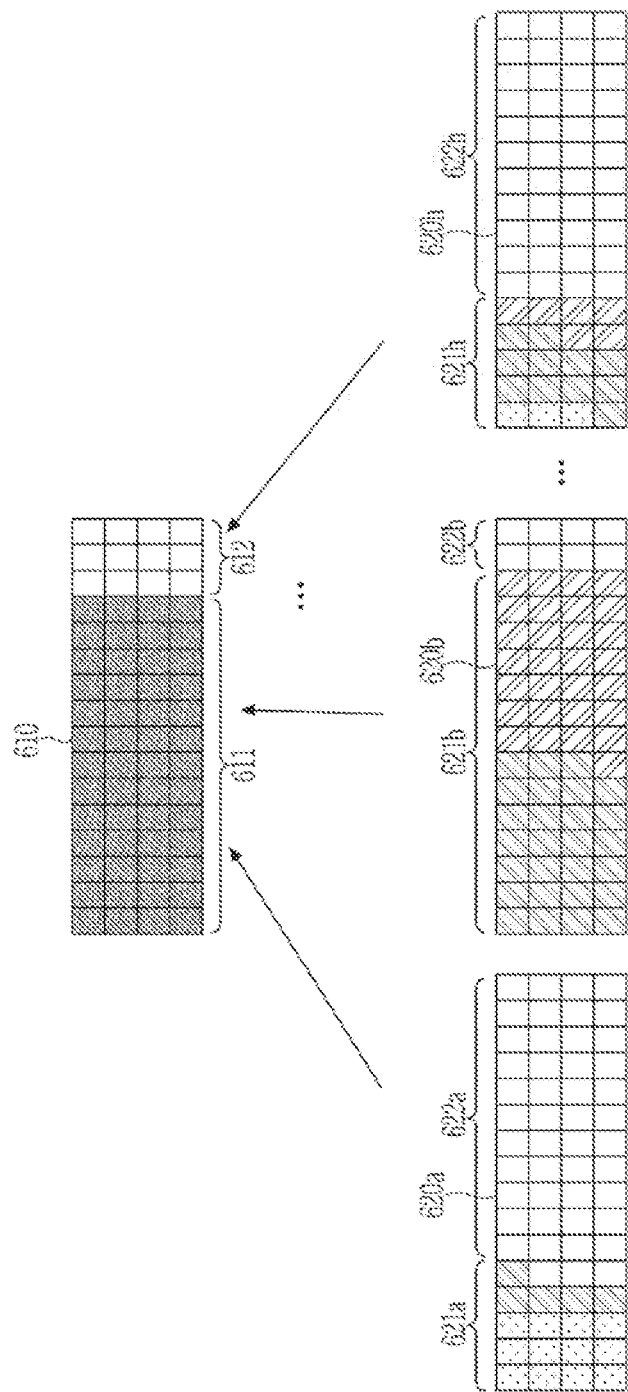
FIG. 6 illustrates memories of CXL devices according to an embodiment of the present disclosure.

FIG. 6 illustrates memories of CXL devices before a work distribution method is performed according to an embodiment of the present disclosure.

Referring to FIG. 5 and FIG. 6 together, data of work to be processed is excessively stored in memory 610 of the CXL, device CXL. DEVICE #0, A portion 611 of a memory 610 is used by data of work to be processed, and a remaining portion 612 of the memory 610 is usable. Portions 621a, 621b, ..., and 621h of memories 620a, 620b, ..., and 620h of the other CXL devices CXL DEVICE #1, ..., and #n are being used by a process currently being processed by each of the other CXL devices CXL DEVICE #1, ..., and #n. Remaining portions 622a, 622b, ..., and 622h of the memories 620a, 620b, ..., and 620h of the other CXL devices CXL DEVICE #1, ..., and #n are usable. The other CXL devices CXL DEVICE #1, ..., and #n may report capacities of the remaining portions 622a, 622b, ..., and 622h among the capacities of the memories 620a, 620b, ..., and 620h to the CXL device CXL DEVICE #0 as usable capacities.

In step S502, the CXL device CXL DEVICE #0 may determine a CXL device to which work is to be allocated based on the usable capacity of each of the other CXL devices CXL DEVICE #1, ..., and #n. In some embodiments, the CXL device CXL DEVICE #0 may determine a CXL device to which work is to be allocated by comparing the usable capacity of each of the memories 620a, 620b, ..., and 620h with the usable capacity of the memory 610. For example, the CXL device CXL DEVICE #0 may determine that the work is assigned to the CXL device including the memories 620a and 620h because the usable capacity of the memories 620a and 620h is greater than or equal to the usable capacity of the memory 610. The CXL device CXL. DEVICE #0 may determine that the work is not assigned to the CXL device including the memory 620b because the usable capacity of the memory 620b is smaller than the usable capacity of the memory 610. In another embodiment, the CXL device CXL DEVICE #0 may determine a CXL device to which the work is to be allocated by comparing the usable capacities of the memories 620a, 620b, ..., and 620h, respectively, with a reference capacity.

In step S504, the CXL device CXL DEVICE #0 may determine processing rates of the other CXL devices CXL. DEVICE #1, ..., and #n. In some embodiments, the CXL device CXL DEVICE #0 may transmit test work T_DATA to each of the CXL devices to which work is to be allocated among the other CXL devices CXL DEVICE #1, ..., and #n. Among the other CXL devices CXL DEVICE #1, ..., and #n, each of the CXL devices to which work is to be allocated may process the test work T_DATA and transmit results thereof (RT_DATA1, ..., and RT_DATAn). The CXL device CXL DEVICE #0 may determine a work processing rate by using a time it takes to transmit the test work T_DATA and receive each of the results RT_DATA1, ..., and RT_DATAn.

The CXL device CXL DEVICE #0 may transmit the test work T_DATA to each of the CXL devices to which work is to be allocated among the other CXL devices CXL DEVICE #1, ..., and #n through the CXL switch CXL SWITCH. The CXL device CXL DEVICE #0 may receive the results RT_DATA1, ..., and RT_DATAn from each of the CXL devices to which work is to be allocated among the other CXL devices CXL DEVICE #1, ..., and #n through the CXL switch CXL SWITCH. The CXL switch CXL SWITCH may determine a processing rate of the corresponding CXL device by using a data processing time from when transmitting the test work T_DATA to each of the CXL devices to which work is to be allocated among the other CXL devices CXL DEVICE #1, ..., and #n until receiving the respective results RT_DATA1, ..., and RT_DATAn from the CXL devices. For example, the CXL switch CXL SWITCH may determine the processing rate of the CXL device CXL. DEVICE #1 by using the data processing time from transmitting the test work T_DATA to the CXL device CXL DEVICE #1 until receiving the result RT_DATA1, The CXL switch CXL SWITCH may transfer a processing rate of the determined CXL device to the CXL device CXL DEVICE #0. In some embodiments, the CXL switch CXL. SWITCH may also transmit information related to the processing time to the CXL device CXL DEVICE #0. The CXL device CXL DEVICE #0 may transmit the test work T_DATA to the CXL switch CXL SWITCH, and may further determine the data transfer rate through the CXL switch CXL SWITCH based on the time to receive the respective results RT_DATA1, ... and RT_DATAn from the CXL switch CXL SWITCH and the processing time received from the CXL switch CXL SWITCH.

In an embodiment, the CXL device CXL. DEVICE #0 may correct the processing rate of the CXL device that has transmitted the test work T_DATA. In some embodiments, the CXL device CXL DEVICE #0 may correct the processing rate of the CXL device with a smaller usable capacity to be slower. The CXL device CXL DEVICE #0 may correct the processing rate of the CXL device to a lower value when the usable capacity of the CXL device that has transmitted the test work T_DATA is smaller than or equal to a certain percentage of the memory capacity of the CXL device. For example, the CXL device CXL DEVICE #0 may correct the processing rate of the CXL device to have a rate of half an original calculated value when the usable capacity of the CXL device that transmits the test work T_DATA is smaller than half of the memory capacity of the CXL device.

In step S506, the CXL device CXL DEVICE #0 may determine a work distribution amount based on the processing rate (or the corrected processing rate) of each of the CXL devices to which work is to be allocated among the other CXL devices CXL DEVICE #1, . . . , and #n. The CXL device CXL DEVICE #0 may determine the work distribution amount by further considering a data transmission rate of the other CXL devices CXL DEVICE #1, . . . , and #n.

The CXL device CXL. DEVICE #0 may determine the work distribution amount such that a time taken to allocate some of the works to be processed stored in the memory 610 to the other CXL devices CXL DEVICE #1, . . . , and #n and to process the works, and a time it takes for the CXL device CXL DEVICE #0 to process the rest of the works stored in the memory 610 that are not allocated to the other CXL devices CXL DEVICE #1, . . . , and #n are minimized.

In step S508, the CXL device CXL DEVICE #0 may transmit works P_DATA1, . . . , and P_DATAn corresponding to each of the CXL devices to which work is to be allocated among the other CXL devices CXL DEVICE #1, . . . , and #n based on the determined work distribution amount, and each of the CXL devices to which the works P_DATA1, . . . , and P_DATAn are allocated may transmit work results RP_DATA1, . . . , and RP_DATAn to the CXL device CXL DEVICE #0. This will be described together with reference to FIG. 7.

Figure 7:
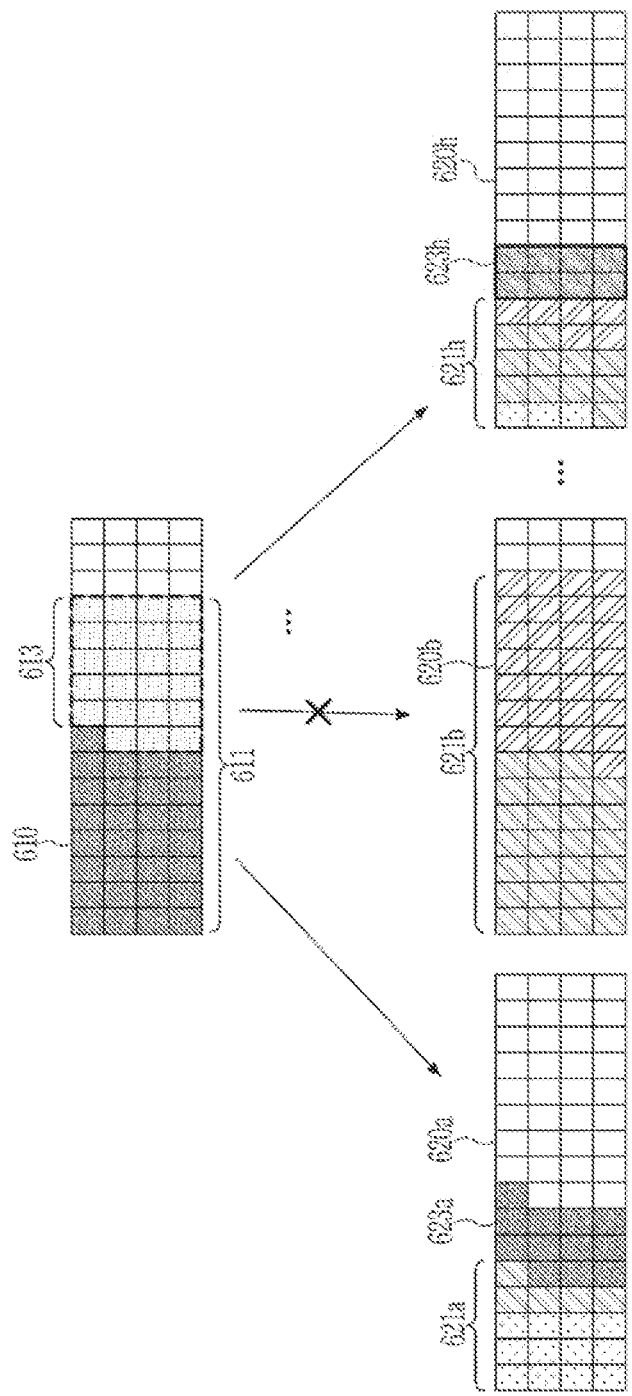
FIG. 7 illustrates memories of CXL devices on which a work distribution method is performed according to an embodiment of the present disclosure.

FIG. 7 illustrates memories of CXL devices on which a work distribution method is performed according to an embodiment of the present disclosure.

Referring to FIG. 5 and FIG. 7 together, the CXL device CXL DEVICE #0 may distribute some (613) of data of work stored in the memory 610 of the CXL device CXL DEVICE #0 to the other CXL devices. The some data 613 may be stored in portions 623a and 623h of the memories 620a and 620h. The data stored in the portions 623a and 623h of the memories 620a and 620h may be processed by a processor of each CXL device, Work may not be allocated from the CXL device CXL DEVICE #0 to the memory 620b due to insufficient usable capacity.

According to an embodiment, the CXL device CXL DEVICE #0 may check the usable capacity of the other CXL devices CXL DEVICE #1, . . . and #n in real time, may determine a work amount that can be processed based on the checked usable capacities, and may distribute the work to the other CXL devices CXL DEVICE #1, . . . , and #n, so as to shorten the processing time of the work.

In the above, it has been described as an example that one CXL device distributes works to other CXL devices. Thus, even when several CXL devices distribute works to the other CXL devices, the work distribution method according to the present disclosure may be applied. In addition, even when a host distributes works to the other CXL devices, the work distribution method according to the present disclosure may be applied.

Figure 8:
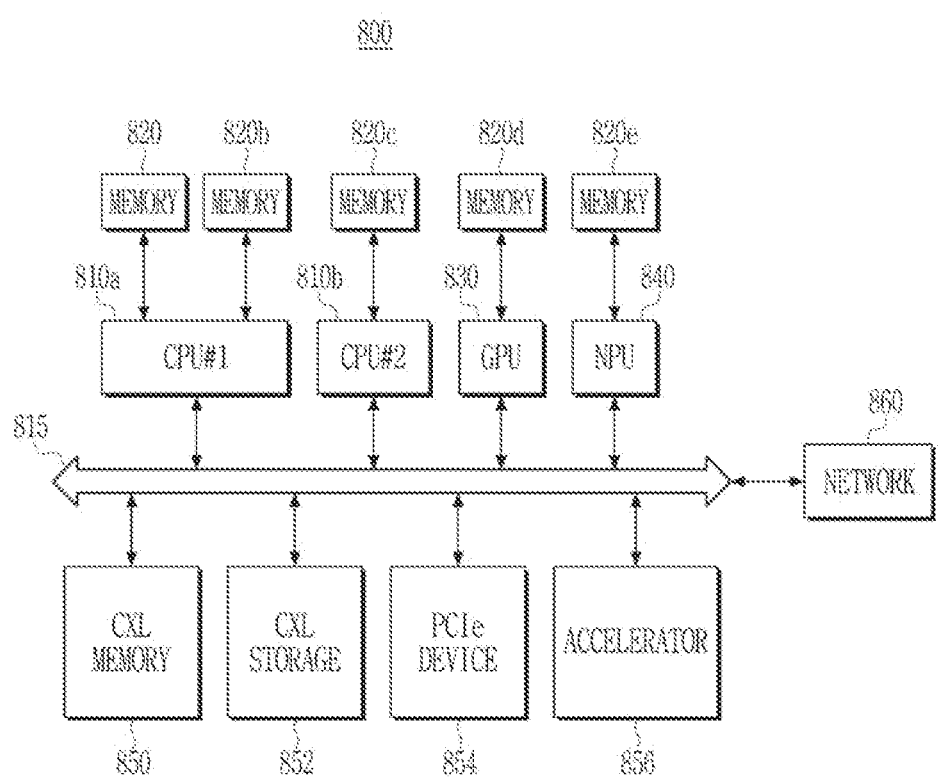
FIG. 8 illustrates a block diagram showing a computer system according to another embodiment of the present disclosure.

FIG. 8 illustrates a block diagram showing a computer system according to another embodiment of the present disclosure.

Referring to FIG. 8, a computer system 800 may include a first CPU 810a, a second CPU 810b, a GPU 830, an NPU 840, a CXL switch 815, a CXL memory 850, a CXL storage 852, a PCIe device 854, and an accelerator (e.g., CXL device) 856.

The first CPU 810a, the second CPU 810b, the GPU 830, the NPU 840, the CXL memory 850, the CXL storage 852, the PCIe device 854, and the accelerator 856 may be connected to the CXL switch 815, and they may communicate with each other through the CXL switch 815.

In an embodiment, each of the first CPU 810a, the second CPU 810b, the GPU 830, and the NPU 840 may be the host described with reference to FIG. 1 to FIG. 7, and may be directly coupled to individual memories 820a, 820b, 820c, 820d, and 820e.

In an embodiment, the CXL memory 850, the CXL storage 852, and the PCIe device 854 may be the CXL devices described with reference to FIG. 1 to FIG. 7. Works may be distributed to the CXL memory 850, the CXL storage 852, and the PCIe device 854 by any one or more of the first CPU 810a, the second CPU 810b, the GPU 830, and the NPU 840, and works may be distributed to the CXL memory 850, the CXL storage 852, and the PCIe device 854 by any one or more of the CXL memory 850, the CXL storage 852, and the PCIe device 854.

In an embodiment, the CXL switch 815 may be connected to the PCIe device 854 or accelerator 856 configured to support various functions, and the PCIe device 854 or the accelerator 856 may communicate with each of the first CPU 810a, the second CPU 810b, the GPU 830, and the NPU 840 through the CXL switch 815, or may access the CXL memory 850 and the CXL storage 852.

In an embodiment, the CXL switch 815 may be connected to an external network 860 or a fabric, and may be configured to communicate with an external server through the external network 860 or the fabric.

Figure 9:
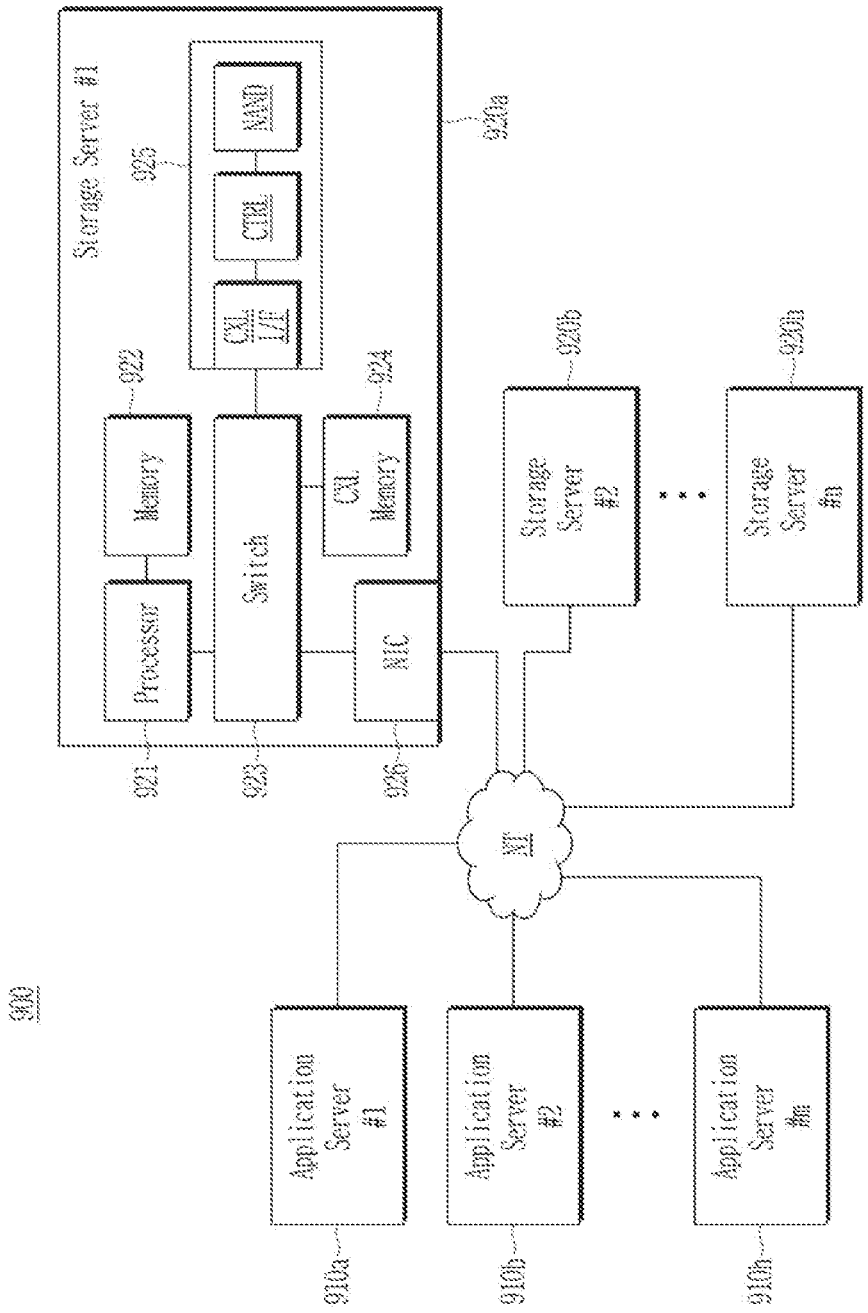
FIG. 9 illustrates a block diagram showing a server system according to an embodiment of the present disclosure.

FIG. 9 illustrates a block diagram showing a server system according to an embodiment of the present disclosure.

Referring to FIG. 9, a data center 900, which is a facility that collects various data, and provides services, is shown. The data center 900 may also be referred to as a data storage center. The data center 900 may be a system for operating a search engine and a database, and may be a computer system used in a government or corporate institution such as a bank. The data center 900 may include application servers 910a, . . . , and 910h and storage servers 920a, . . . , and 920h. A number of application servers and a number of storage servers may be variously selected according to an embodiment, and may be different from each other.

Hereinafter, a configuration of the first storage server 920a will be mainly described. Each of the application servers 910a, . . . , and 910h and the storage servers 920a, . . . , and 920h may have a structure similar to each other, and may communicate with each other through a network NT.

The first storage server 920a may include a processor 921, a memory 922, a switch 923, a storage 925, a CXL memory 924, and a network interface card (NIC) 926. The processor 921 may control an overall operation of the first storage server 920a, may access the memory 922, may execute a command loaded into the memory 922, or may process data. The processor 921 and the memory 922 may be directly connected, and the number of the processors 921 and the number of the memories 922 included in one storage server 920a may be variously selected.

In an embodiment, the processor 921 and the memory 922 may provide a processor-memory pair. In an embodiment, the number of the processors 921 and the number of the memories 922 may be different. The processor 921 may include a single-core processor or a multi-core processor. The above description of the first storage server 920a may be similarly applied to each of the application servers 910a, . . . , and 910h.

The switch 923 may be configured to mediate or route communication between various components included in the first storage server 920a. In an embodiment, the switch 923 may be the CXL switch described in FIG. 2 and FIG. 5, and the like. In other words, the switch 923 may be a switch implemented based on a CXL protocol.

The CXL memory 924 and the storage device 925 may be the CXL devices described with reference to FIG. 1 to FIG. 7.

The CXL memory 924 may be connected to the switch 923. The storage device 925 may include a CXL interface circuit CXL_IF, a controller CTRL, and a NAND flash NAND. The storage device 925 may store data or output stored data depending on a request of the processor 921.

The application servers 910a, . . . , and 910h may not include the storage device 925.

The network interface card (NIC) 926 may be connected to the CXL switch 923. The NIC 926 may communicate with other storage servers 920a, . . . , and 920h or other application servers 910a, . . . , and 910h via the network NT.

In an embodiment, the MC 926 may include a network interface card, a network adapter, and the like. The MC 926 may be connected to the network NT by a wired interface, a wireless interface, a Bluetooth interface, an optical interface, or the like. The MC 926 may include an internal memory, a digital signal processor (DSP), a host bus interface, and the like, and may be connected to the processor 921 and/or switch 923 through the host bus interface. In an embodiment, the MC 926 may be integrated with at least one of a processor 921, a switch 923, or the storage device 925.

In an embodiment, the network NT may be implemented using a fiber channel (FC), Ethernet, or the like. In this case, the FC, which is a medium used for relatively high-rate data transmission, may use an optical switch providing high performance and high availability. The storage servers 920a, . . . , and 920h may be provided as file storage, block storage, or object storage depending on an access method of the network NT.

In an embodiment, the network NT may be a storage-only network, such as a storage area network (SAN). For example, the SAN may be an FC-SAN that uses an FC network and is implemented depending on an FC protocol (FCP). As another example, the SAN may be an IP-SAN that uses a TCP/IP network and is implemented depending on an iSCSI (SCSI over TCP/IP or Internet SCSI) protocol. In an embodiment, the network NT may be a general network such as a TCP/IP network. For example, the network NT may be implemented depending on protocols such as FC over Ethernet (FCoE), Network Attached Storage (NAS), and NVMe over Fabrics (NVMe-oF).

In an embodiment, at least one of the application servers 910a, . . . , and 910h may store data requested to be stored by a user or a client in one of the storage servers 920a, . . . , and 920h through the network NT. At least one of the application servers 910a, . . . , and 910h may acquire data requested by a user or a client to be read from one of the storage servers 920a, . . . , and 920h through the network NT. For example, at least one of the application servers 910a, . . . , and 910h may be implemented as a web server or a database management system (DBMS).

In an embodiment, at least one of the application servers 910a, . . . , and 910h may access a memory, a CXL memory, or a storage device included in another application server through the network NT, or may access memories, CXL memories, or storage devices included in the storage servers 920a, . . . , and 920h through the network NT, Accordingly, at least one of the application servers 910a, . . . , and 910h may perform various operations on data stored in other application servers 910a, . . . , and 910h and/or storage servers 920a, . . . , and 920h. For example, at least one of the application servers 910a, . . . , and 910h may execute a command to move or copy data between other application servers 910a, . . . , and 910h and/or storage servers 920a, . . . , and 920h. In this case, data may be moved to the memory or the CXL memory of the application servers 910a, . . . , and 910h directly or from the storage device of the storage servers 920a, . . . , and 920h through the memories or CXL memories of the storage servers 920a, . . . , and 920h. Data moving through the network may be encrypted for security or privacy.

In some embodiments, each component or combinations of two or more components described with reference to FIG. 1 to FIG. 9 may be implemented as a digital circuit, a programmable or non-programmable logic device or array, an application specific integrated circuit (ASIC), or the like.

While this disclosure has been described in connection with what is presently considered to be example embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus, comprising:
   a plurality of compute express link (CXL) devices each including a memory and a processor for processing works stored in the memory; and
   a switch configured to connect the CXL devices to each other,
   wherein a first CXL device among the plurality of CXL devices selects at least one second CXL device from at least some CXL devices of the plurality of CXL devices to distribute works stored in a memory of the first CXL device based on a usable capacity of a memory of the at least some CXL devices,
   wherein the first CXL device determines an amount of the works to distribute to the at least one second CXL device based on a work processing rate of the at least one second CXL device,
   wherein the first CXL device transmits test work to each of the at least one second CXL device, receives a result of the test work from each of the at least one second CXL device and determines a work processing rate of each of the at least one second CXL device based on a time it takes to transmit the test work and receive the test work.

2. The apparatus of claim 1, wherein
   the first CXL device corrects the work processing rate of each of the at least one second CXL device based on a usable capacity of each of the at least one second CXL device.

3. The apparatus of claim 2, wherein
the first CXL device corrects a work processing rate of a second CXL device having a smaller usable capacity among the at least one second CXL device to be slower.

4. The apparatus of claim 1, wherein
the first CXL device determines a work amount to be distributed to the at least one second CXL device based on a first time required to allocate some of the works stored in the memory of the first CXL device to the at least one second CXL device and process the some of the works stored in the memory, and a second time required for the first CXL device to process a remainder of the works stored in the memory of the first CXL device that are not allocated to the at least one second CXL device.

5. The apparatus of claim 4, wherein
the first CXL device determines the work amount to be distributed to the at least one second CXL device such that the first time and the second time are substantially equal.

6. The apparatus of claim 1, wherein
the first CXL device selects a CXL device including a memory having a usable capacity that is equal to or greater than that of a memory of the first CXL device as the at least one second CXL device.

7. The apparatus of claim 1, wherein
the first CXL device selects a CXL device including a memory having a usable capacity that is greater than or equal to a reference usable capacity as the at least one second CXL device.

8. The apparatus of claim 1, wherein
the first CXL device transmits a command for checking usable capacity to remaining CXL devices of the plurality of CXL devices except for the first CXL device among the CXL devices through the switch, and
each of the remaining CXL devices checks its usable capacity by checking its memory usage when receiving the command.

9. The apparatus of claim 1, wherein
the first CXL device distributes the works to the at least one second CXL device depending on a work amount to be distributed to the at least one second CXL device, checks a usable capacity of a memory of the CXL devices of the plurality of CXL devices, and selects at least one third CXL device among the plurality of CXL devices to which the works stored in the memory of the first CXL device is further distributed based on the usable capacity of the memory of the CXL devices.

10. The apparatus of claim 1, wherein
works distributed from at least one remaining CXL device of the plurality of CXL devices other than the first CXL device is stored in the memory of the first CXL device.

11. The apparatus of claim 1, wherein
the works include data and a program used to process the data.

12. An apparatus, comprising:
a plurality of first devices each including a memory and a processor for processing works stored in the memory; and
a second device configured to determine at least one first device among the first devices to which works are to be distributed and a work amount to be distributed based on a work processing rate of each of the first devices and a usable capacity of a memory of each of the first devices, and to distribute works based on a work amount corresponding to each of the first devices to the at least one first device to which the works are to be distributed,
wherein the second device corrects a work processing rate of each of the first devices based on the usable capacity of the memories of the first devices, and determines the work amount corresponding to each of the first devices based on the corrected work processing rate of the first devices,
wherein the work amount corresponding to each of the first devices increases as a work processing rate of each of the corrected first devices increases.

13. A method performed by a computing system including a plurality of compute express link (CXL) devices, the method comprising:
checking usable capacities of the CXL devices;
selecting at least one first CXL device to which works are to be distributed among the CXL devices based on the usable capacities of the plurality of CXL devices;
checking a work processing rate of the at least one first CXL device; and
determining a distribution amount of works to be allocated to each of the at least one first CXL device based on the work processing rate of the at least one first CXL device,
wherein the checking of the work processing rate of the at least one first CXL device includes:
transmitting test work to each of the at least one first CXL device;
receiving a result of the test work from each of the at least one first CXL device; and
calculating a work processing rate of the at least one first CXL device based on a time from when the test work was transmitted to each of the at least one first CXL device until receiving a result of the test work from each of the at least one first CXL device.

14. The method of claim 13, further comprising:
correcting a work processing rate of each of the at least one first CXL device based on a usable capacity of each of the at least one first CXL device,
wherein the determining of the distribution amount of the works includes determining the distribution amount of the works to be allocated to each of the at least one first CXL device based on the corrected work processing rate.

15. The method of claim 14, wherein
the correcting of the work processing rate includes:
correcting a work processing rate of the at least one first CXL device having a smaller usable capacity among the at least one first CXL device to be slower.

* * * * *